(12) United States Patent
Kinder et al.

(10) Patent No.: US 7,787,401 B2
(45) Date of Patent: Aug. 31, 2010

(54) USING MINI-BEACONS IN A WIRELESS NETWORK

(75) Inventors: Richard D. Kinder, Eastwood (AU); Alex C. K. Lam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 484 days.

(21) Appl. No.: 11/156,054

(22) Filed: Jun. 17, 2005

(65) Prior Publication Data

US 2006/0285507 A1    Dec. 21, 2006

(51) Int. Cl.
*H04B 7/00* (2006.01)
*H04W 4/00* (2009.01)

(52) U.S. Cl. ................. 370/310; 370/328; 370/338; 455/434

(58) Field of Classification Search ......... 370/310, 370/251, 401, 412, 254, 338, 328, 334, 432, 370/433, 449, 475; 455/453, 435.2, 41.2, 455/434
See application file for complete search history.

(56) References Cited

U.S. PATENT DOCUMENTS

| | | | | |
|---|---|---|---|---|
| 6,665,269 | B1 * | 12/2003 | Schmitz | 370/251 |
| 7,440,418 | B2 * | 10/2008 | Marinier et al. | 370/254 |
| 7,492,744 | B2 * | 2/2009 | Dooley et al. | 370/338 |
| 2004/0013128 | A1 | 1/2004 | Moreton et al. | 370/447 |
| 2004/0196812 | A1 * | 10/2004 | Barber | 370/334 |
| 2005/0068928 | A1 | 3/2005 | Smith et al. | 370/338 |
| 2005/0128988 | A1 * | 6/2005 | Simpson et al. | 370/338 |
| 2005/0136845 | A1 * | 6/2005 | Masuoka et al. | 455/67.14 |
| 2005/0226207 | A1 * | 10/2005 | Sharma | 370/350 |
| 2005/0286446 | A1 | 12/2005 | Barber | 370/278 |
| 2006/0056367 | A1 * | 3/2006 | Marinier et al. | 370/338 |
| 2006/0089138 | A1 * | 4/2006 | Smith et al. | 455/426.1 |
| 2006/0165103 | A1 * | 7/2006 | Trudeau et al. | 370/401 |
| 2007/0014267 | A1 * | 1/2007 | Lam et al. | 370/338 |
| 2007/0195727 | A1 * | 8/2007 | Kinder et al. | 370/328 |

OTHER PUBLICATIONS

M. Baker, Y Chen and S. Emeott, "Measurement Collection for Neighbor Tracking and Handover in an IEEE 802.11 Home Environment," World Wireless Congress, San Francisco, CA, May 2005, Pub. Date: May 24, 2005.
Steve Emeott, et al. "IEEE 802.11 04/1010: Proposal and Normative Text for a Scheduled Autonomous Probe Response Generation Function," Sep. 9, 2004, presented by Motorola, inc. in an IEEE 802.11 Group k (IEEE 802.11k) Wireless LAN meeting.

* cited by examiner

*Primary Examiner*—George Eng
*Assistant Examiner*—Brandon J Miller
(74) *Attorney, Agent, or Firm*—Dov Rosenfeld; INVENTEK (57) ABSTRACT

A method, apparatus, and software containing computer readable code to implement the method implemented in a first wireless device, e.g., an access point. The method includes, for a particular network identifier, e.g., BSSID, of at least one network identifier supported by the first wireless device that including a transmitter and modulator, each network identifier identifying a wireless network, e.g., an IEEE 802.11 BSS for which the first wireless device acts as an access point, transmitting full parent beacon frames periodically at the beacon frame rate for the particular network identifier; and transmitting at least one mini-beacon frames in between consecutive full parent beacon frames for the particular network identifier. Each mini beacon frame includes a subset of the information in a full parent beacon frame, and further including timing information indicative of when the next full parent beacon frame will be transmitted for the particular network identifier.

23 Claims, 7 Drawing Sheets

| Beacon frame body | | |
|---|---|---|
| Order | Information | Notes |
| 1 | Timestamp | |
| 2 | Beacon interval | |
| 3 | Capability information | |
| 4 | SSID | |
| 5 | Supported rates | |
| 6 | FH Parameter Set | The FH Parameter Set information element is present within Beacon frames generated by STAs using frequency-hopping PHYs. |
| 7 | DS Parameter Set | The DS Parameter Set information element is present within Beacon frames generated by STAs using direct sequence PHYs. |
| 8 | CF Parameter Set | The CF Parameter Set information element is only present within Beacon frames generated by APs supporting a PCF. |
| 9 | IBSS Parameter Set | The IBSS Parameter Set information element is only present within Beacon frames generated by STAs in an IBSS. |
| 10 | TIM (Traffic indication map) | The TIM information element is only present within Beacon frames generated by APs. |
| | | |
| ⋮ | ⋮ | ⋮ |
| | SSIDL information element | The SSID list IE is present to provide for multiple BSSID support. |
| ⋮ | ⋮ | ⋮ |

| Table 2—Mini-Beacon frame fields |||||
|---|---|---|---|---|
| Order | Order in full beacon | Information | Notes ||
| 1 | 1 | Timestamp | As per in the main beacon ||
| 2 | 2 | Beacon interval | This is the interval of the mini-beacon | 605 |
| 3 | 3 | Capability information |||
| 4 | 4 | SSID | This information element (IE) is length 1 and contain a single null character ||
| 5 | 5 | Supported rates | This IE is length 1 and contains the byte 0x81. This requires a basic rate of 0.5Mbps which no client would support. In an alternate embodiment, another value that no client would support is used. ||
| 6 | 7 | DS Parameter Set | If a DSSS PHY is used, this IE contains the current channel the mini-beacon is being transmitted on. ||
| 7 | 10 | TIM | This is the same TIM as in the parent Beacon frame. This would allow mini-beacon aware clients to check for power save traffic on each mini-beacon rather than waiting for the parent beacon. ||
| 8 | n/a | Mini-Beacon additional IE | This is an additional IE for mini-beacons that describes when the next full beacon arrives. See FIG. 4. ||

FIG. 6

| Table 3—Mini-Beacon additional IE |||
|---|---|---|
| Information | Length | Notes |
| Element ID | 1 | The vendor element value (224) |
| Length | 1 | The value 5 |
| OUI/Type | 4 | The value 0X004096XX (XX chosen by vendor) |
| PeriodCount | 1 | Count until a parent beacon |

USING MINI-BEACONS IN A WIRELESS NETWORK

BACKGROUND

The present invention is related to wireless networks, and in particular to a method and apparatus for transmitting "mini-beacons" from an access point of a wireless local area network (WLAN) that provides sufficient information to associated or potentially-associating client stations, and that avoids the potential waste of bandwidth that would occur if only full-size beacons were broadcasted by the access point.

The examples herein will be described in terms of a wireless local area network that conforms to the IEEE 802.11 standard, but the invention is not restricted to such a network.

In IEEE 802.11-conforming wireless networks, at the MAC medium access control (MAC) level, beacon frames are sent out periodically by an access point (AP). One purpose of a beacon frame is to indicate to clients associated with the AP that the AP they are connected to is still working. Another purpose is to synchronize time in the basic service set (BSS) of the AP. Beacon frames convey information to the associated and associating clients as to the properties of the access point transmitting the beacons.

A new feature being developed for wireless devices is the ability for a single wireless device to act as multiple "virtual" access points, each for a different infrastructure wireless network. Thus, a single wireless device can act as an access point, also called a base station, for a plurality of infrastructure networks. Each infrastructure network is identified by a network identifier. In the language of the IEEE 802.11 standard, each infrastructure network is called a basic service set (BSS), and the network identifier is a basic service set identifier (BSSID). For an AP, the BSSID is the MAC address of the AP. Thus, a single wireless device can have a plurality of BSSIDs (MAC addresses). To a client station, a multiple BSSID-AP appears to be several distinct co-located APs.

Beacon frames can be quite large, especially for multiple BSSID APs, considering advanced features such as lists of SSIDs, (SSIDL, SSID lists), and especially in a busy environment. Furthermore, a single AP that act as a plurality of "virtual" APs needs to transmit a single beacon for each BSSID supported, and each such beacon may be large. Thus, beacon frames can consume significant bandwidth that could otherwise productively be used for data. This is exacerbated by the fact that beacon frames are transmitted at the lowest data rate for the basic service set (BSS).

As an example, consider a multiple-BSSID AP configured with 16 SSIDs, each of size 16 bytes. In such a case, the SSIDL element of a beacon frame is at least 16×16=256 bytes. The rest of the beacon might consist of around 100 bytes, for a total of 356 bytes for a single beacon frame. Suppose further that the beacon period is 100,000 µsec, and beacon frames are sent at a data rate of 1 Mbps. This results in about 3% of the transmission time, excluding medium access times, dedicated to transmitting beacon frames. If one scales this up to multiple BSSID's on a single channel, then the relative time used on beacon overhead can become even more significant. For example, for 16 BSSIDs, the time taken by beacons is more than 45%.

Furthermore, as more and more features and capabilities are added to wireless networks, the size of beacon frames keeps increasing as more information is added to such beacon frames.

Thus there is a need in the art for a mechanism other than full IEEE 802.11 MAC beacon frames, in order to reduce the bandwidth used by beacon frames.

Recently, a proposal for "Scheduled Autonomous Probe Response" (SAPR) was made by Motorola, inc. in an IEEE 802.11 Group k (IEEE 802.11k) Wireless LAN meeting. See "IEEE 802.11 04/1010: Proposal and Normative Text for a Scheduled Autonomous Probe Response Generation Function," Date: Sep. 9, 2004, authors Steve Emeott, et al. The idea is to reduce passive scan latency. The SAPR generation function allows an AP to autonomously transmit Probe Response frames at periodic intervals. The SAPR interval is indicated by a SAPR subfield included in a SAPR information element within Beacon and Probe Response frames. The presence of scheduled, autonomous Probe Response frames with the SAPR information element allows stations to rapidly take measurements and find neighbor APs using passive scanning. Thus, the idea is to reduce the amount of time required for passive scanning clients to "find" an AP. Thus, the purpose of SAPR frames is to increase interactivity. Such SAPR frames are for the purpose of passive scanning (measuring RSSI), e.g., by clients of the AP. SAPR frames are also called Gratuitous Probe Response-(GPR) frames.

There still remains a need in the art for a mechanism to provide essential information that is in beacon frames to associated or associating client stations, while decreasing the amount of bandwidth used compared to using full, potentially large beacon frames. This potentially frees up bandwidth for non-management traffic.

SUMMARY

One aspect of the invention described herein provides a backward compatible solution to the problem of more and more bandwidth being taken up by ever increasing beacon frame sizes. Described herein is a "mini-beacon" that is transmitted between full size beacon frames.

Further described herein is a method implemented in a first wireless device, e.g., an access point. The method includes, for a particular network identifier, e.g., BSSID, of at least one network identifier active in the first wireless device that supports at least one network identifier, the first wireless device including a transmitter and modulator for transmitting, and MAC hardware coupled to the transmitter and modulator, each network identifier identifying a wireless network, e.g., an IEEE 802.11 BSS for which the first wireless device acts as an access point, transmitting full parent beacon frames periodically at the beacon frame rate for the particular network identifier; and transmitting at least one mini-beacon frames in between consecutive full parent beacon frames for the particular network identifier. Each mini beacon frame includes a subset of the information in a full parent beacon frame, and further including timing information indicative of when the next full parent beacon frame will be transmitted for the particular network identifier. This transmitting is such that a second wireless device for which the first wireless device acts as an access point can determine when the next full parent beacon frame is to be transmitted.

Other features and aspects will be clear from the description herein, including the claims and drawings.

DETAILED DESCRIPTION

Described herein is a method and a mechanism for using a "mini-beacon" frame that is broadcast by an access point and that contains a small amount of information relative to a full beacon frame. One embodiment is in the form of a method, and software, e.g., computer-readable code stored in a carrier medium that provides for transmitting mini-beacon frames in between full beacon frames, called parent beacon frames to the mini-beacons that follow for the same BSSID, in a wireless device.

The invention is particularly useful for a device that supports multiple BSSIDs, i.e., that can act as a plurality of APs. However, the invention is also useful in APs that support a single BSSID.

The Network Architecture

Figure 1:
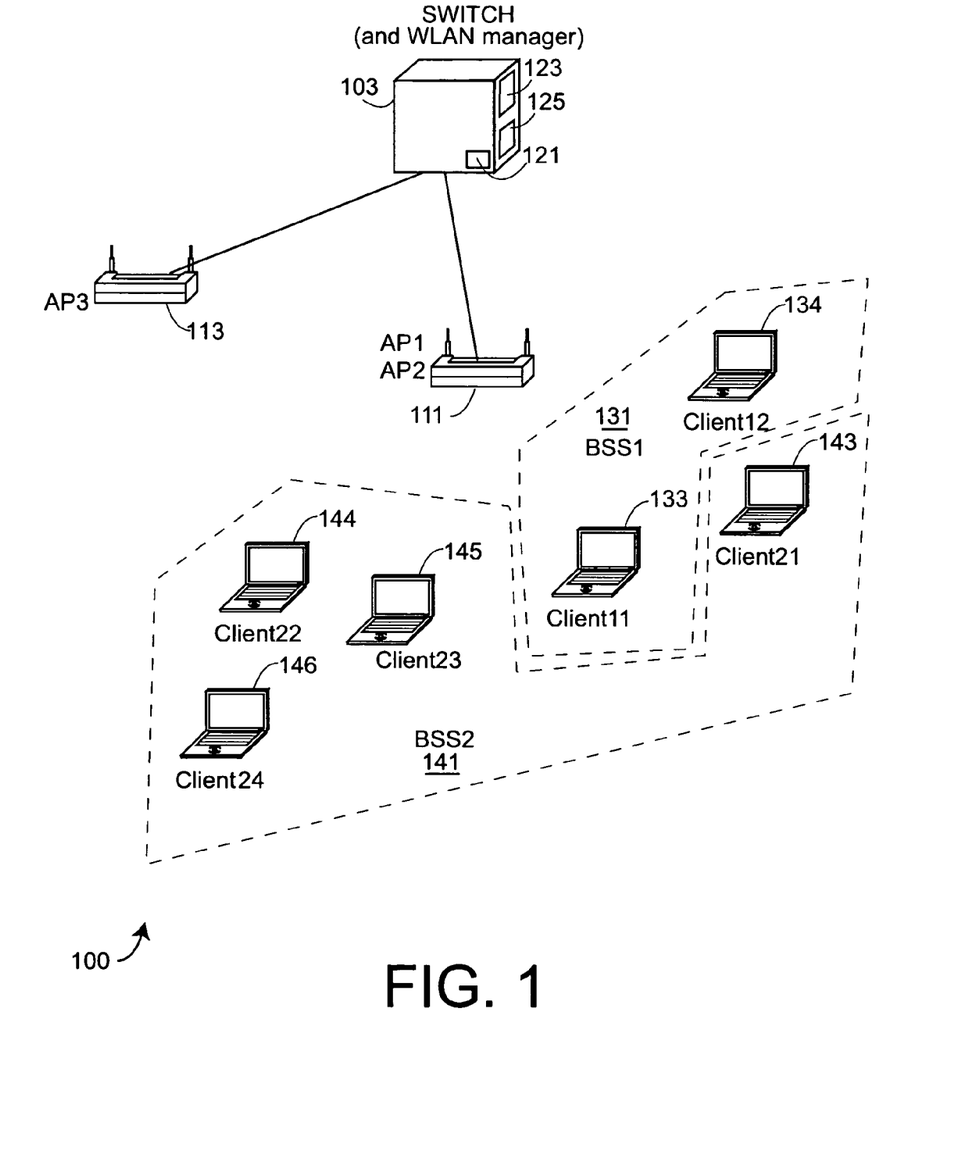
FIG. 1 shows part of an exemplary wireless network 100 that includes a wireless device that includes an embodiment of the present invention in that the device transmits mini-beacon frames in between full beacon frames for a particular BSSID.

FIG. 1 shows part of an exemplary network 100 in which the present invention operates. A set of wireless devices acting as APs—two devices, 111 and 113—are shown coupled to a network device 103. The network device, for example may include a switch. Device 111 has two basic service sets, respectively denoted BSS1 (131) and BSS2 (141) that have a BSSID denoted BSSID1 and BSSID2, respectfully. Wireless device 111 thus acts as two APs, denoted AP1, and AP2. In this description, the wireless device 111 includes an embodiment of the present invention. For each BSSID, mini-beacons are transmitted between each full (parent) beacon frame.

The network device 103 may also perform other functions, e.g., network device 103 may act as a switch 103 and may also act as a WLAN manager managing such aspects as security and the setting of radio parameters. For the remainder of the description, the device 103 is assumed to be a switch. The coupling of the wireless devices 111 and 113 to the switch 103 may be direct, or via a network. In one embodiment, the coupling is via a fast network such as a Gigabit Ethernet.

BSS1, shown with reference numeral 131, is managed by AP1 of wireless device 111 with BSSID1, and includes client stations 133 and 134, respectively denoted Client11 and Client12. BSS2, shown with reference numeral 141, is managed by AP2 of wireless device 111 with BSSID2, and includes client stations 143, 144, 145, and 146, respectively denoted Client21, Client22, Client23, and Client24. While the drawing shows that the device 111 supports two BSSIDs, in general, a multiple-BSSID wireless device supports a larger number of BSSIDs.

The switch includes a switch processor 123 coupled to a switch memory 125. Part of the switch memory 125 includes code that causes the processor, in combination with hardware and/or software in wireless device 111, to implement the mini-beacon transmitting aspects of the present invention.

Figure 2:
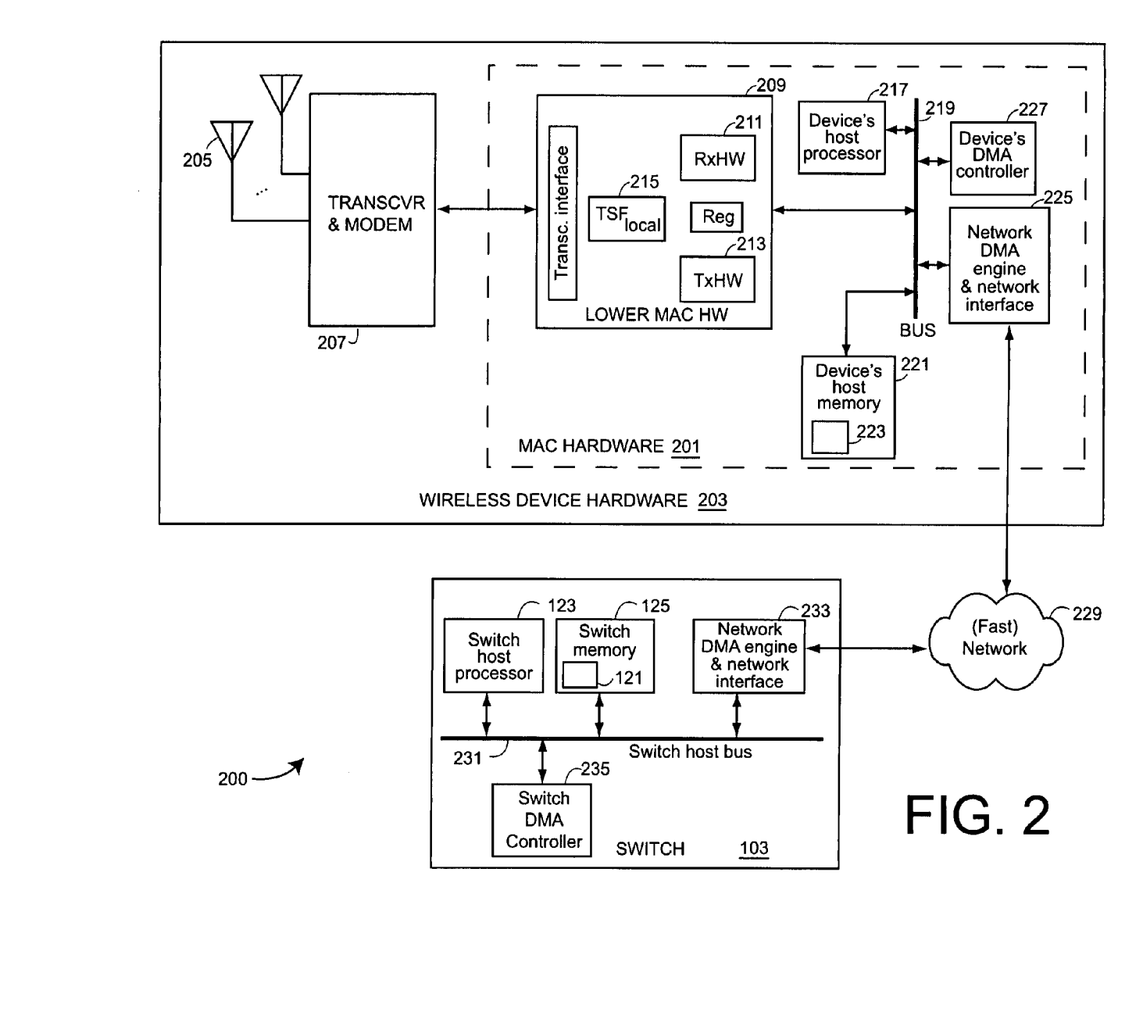
FIG. 2 shows a simplified block diagram of one embodiment of the hardware of a wireless device that includes aspects of the present invention.

FIG. 2 shows a simplified block diagram of one embodiment 200 of the hardware that operates wireless device 111, including aspects of the present invention for transmitting mini-beacons between full parent beacons for each BSSID. Note that the present invention may also be incorporated in an AP that has only a single BSSID. The hardware at the wireless device is shown as wireless device hardware 203, and is coupled to the switch 103. In one embodiment, part of the operation of the MAC is carried out at the switch 103, and other, lower function parts are carried out in the wireless device hardware 203. The coupling between the access point hardware 203 and switch 103 is via a fast, e.g., Gigabit Ethernet network 229.

The wireless device hardware 203 in one embodiment includes one or more antennas 205 for transmitting and receiving, coupled to a transceiver and modem 207 that receives MAC frames of information, and that transmits MAC frames. The transceiver and modem 207 is coupled to a MAC processor. In the embodiment shown, the functionality of the MAC processor is split between lower MAC hardware 209, a processing system on the wireless device hardware 203, and the switch 103. The transceiver and modem 207 is coupled to the lower MAC hardware 209 via a transceiver interface in the lower MAC hardware. The lower MAC hardware 209 includes receive MAC hardware 211, transmit MAC hardware 213, a local TSF clock 215 denoted $TSF_{local}$, and a register set for passing data. The wireless device hardware 203 is coupled to a wireless device processing system that includes a wireless device host processor 217 coupled via a bus subsystem 219 to a memory 221—the wireless device host memory. A DMA controller 227 deals with DMA transfers.

Those parts of the MAC processing that are based in the wireless device, including aspects of the present invention, are controlled by code 223 that is loaded into the wireless device's host memory 221.

For purposes of this description, the combination of the lower MAC hardware 209 and the wireless device processing system that include, e.g., the wireless device host processor 217 coupled via the bus subsystem 219 to the memory 221, is called the MAC hardware 201 herein, and is shown within a dashed line box in FIG. 2, recognizing of course that the wireless device processing system is used for other aspects of operating the wireless device, e.g., operating the device as a wireless station, and not having to do specifically with MAC processing.

In addition, aspects of the MAC processing, including aspects of the present invention, are carried out at the switch 103.

In one embodiment, the switch 103 includes a switch processing system that has a switch host processor 123, and switch memory 125 coupled to the host processor 123 via a bus subsystem 231. The switch 103 further includes a DMA controller 235 to set up DMA transfers to and from the switch memory 125. Some aspects of the present invention are in the form of code to instruct the processor 123 to carry out one or more steps of a method embodiment of the invention. Thus, aspects of the invention are in the form of code 121 carried in a carrier medium, e.g., memory 125. Furthermore, aspects of the invention may be in the form of a carrier medium that is split between the wireless device hardware 203 and the switch 103, e.g., as a combination of code 223 and code 121.

In the embodiment shown here, when the wireless device transmits, data is streamed from the switch memory 125 directly to the transmit hardware 213 during transmission via a fast network link as if there was no network present. Such streaming is controlled at the wireless device by a network DMA engine and network interface 225 that uses special frames to set up the streaming from the switch memory 125. At the switch, a switch network DMA engine and network controller 233 understands the special frames and uses the information therein to set up the DMA via the switch DMA controller 235. The DMA transfer itself also uses special frames that are formed at the switch's network DMA engine and network controller 233, and understood at the wireless device's network DMA engine and network controller 225.

Furthermore, during receive, in the embodiment shown herein, data is streamed directly into the switch memory 125 via the network 229 as if there was a direct, non-network connection. Such streaming is carried out also using the wireless devices' network DMA engine and network interface 225, and the switch's DMA engine and network interface 233, again using special frames for both setting up the DMA streaming and for streaming of the data itself.

The streaming aspects are described in co-pending U.S. Pending patent application Ser. No. 10/724,559 filed Nov. 26, 2003 to Krischer, et al., titled "A METHOD AND APPARATUS TO PROVIDE DATA STREAMING OVER A NETWORK CONNECTION IN A WIRELESS MAC PROCESSOR", and Ser. No. 10/815,283 filed Mar. 31, 2004 to Krischer, et al., titled "METHOD AND APPARATUS TO PROVIDE INLINE ENCRYPTION AND DECRYPTION FOR A WIRELESS STATION VIA DATA STREAMING OVER A FAST NETWORK," both assigned to the assignee of the present invention. The contents of both application Ser. Nos. 10/724,559 and 10/815,283 are incorporated herein by references for all purposes.

Figure 3:
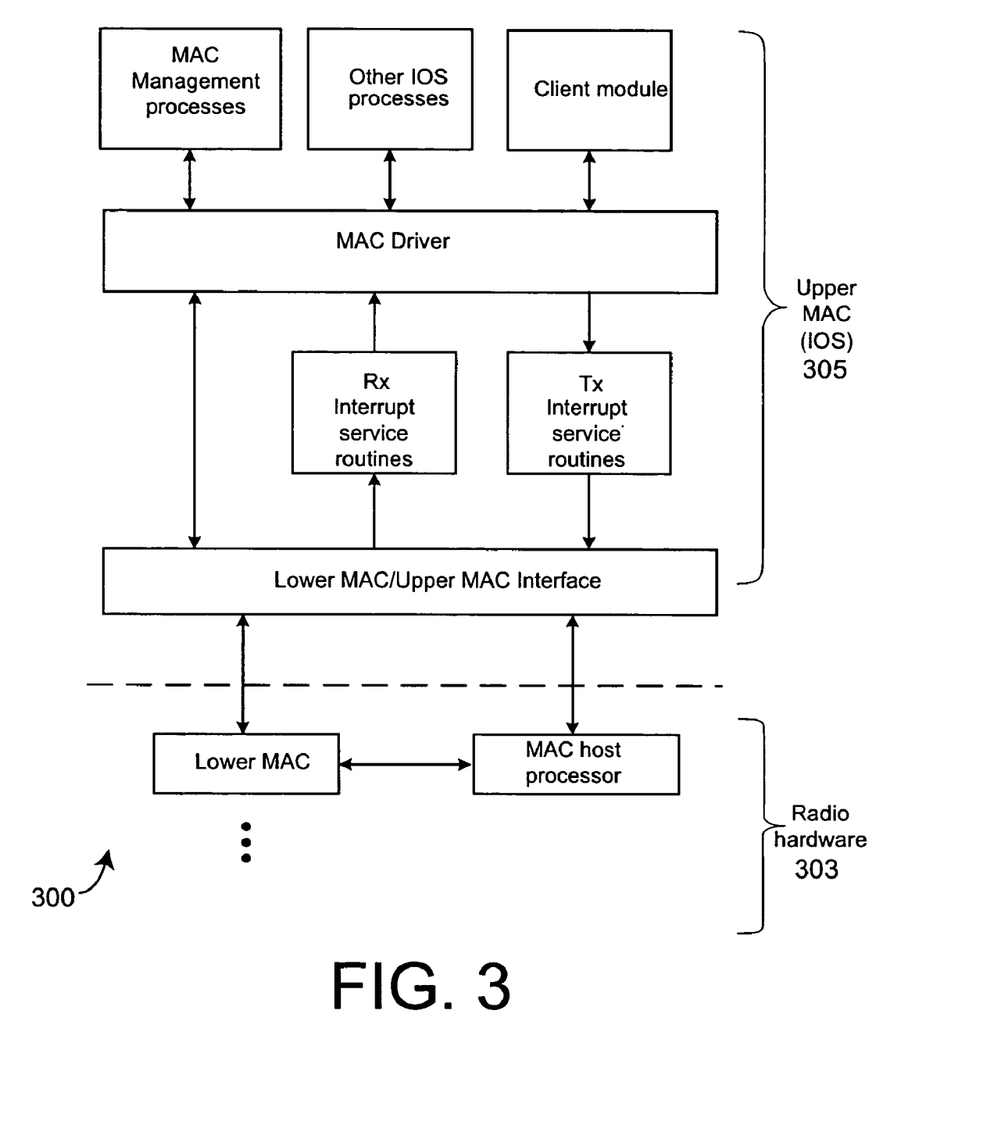
FIG. 3 shows, in simplified block diagram form, one embodiment of a software architecture for the wireless device shown in FIG. 3 that includes an implementation of one or more aspects of the present invention.

FIG. 3 shows one embodiment 300 of a software architecture for the wireless device shown in FIG. 2. The tasks are split between the switch 103, with software 305 operating on the switch host processor 123, e.g., under IOS, the operating systems used in switches made by Cisco Systems, Inc., San Jose, Calif., related to the assignee of the present invention, and software 303 operating in the wireless device hardware 203, in particular, the wireless device hardware's host processor 217 and the lower MAC hardware 209. MAC functions occur as interrupt routines that operate under IOS.

It should be noted that the present invention does not depend on any particular architecture of the wireless device used as the wireless device supporting multiple BSSIDs, or of the MAC processing therein. For example, the network link with the network DMA processors 225 at the wireless device and 233 at the switch can be replaced by non-network connections. Furthermore, in a more traditional architecture, the DMA transfers during transmit and receive can be from and to the wireless device host memory 221. Those in the art will recognize other architectures are possible.

Mini-Beacons

One aspect of the invention is transmitting mini-beacon frames in between consecutive full beacon frames for a BSSID. One aspect is that the mini-beacon frame includes information of a full beacon frame, called a parent frame, but with all but the absolutely essential information elements stripped from it.

One embodiment is a method implemented in a first wireless device, e.g., an access point. The method that includes, for a particular network identifier, e.g., BSSID, of at least one network identifier active in the first wireless device that supports at least one network identifier, the first wireless device including a transmitter and modulator for transmitting, and MAC hardware coupled to the transmitter and modulator, each network identifier identifying a wireless network, e.g., an IEEE 802.11 BSS for which the first wireless device acts as an access point, transmitting full parent beacon frames periodically at the beacon frame rate for the particular network identifier; and transmitting at least one mini-beacon frame in between consecutive full parent beacon frames for the particular network identifier. Each mini beacon frame includes a subset of the information in a full parent beacon frame, and further including timing information indicative of when the next full parent beacon frame will be transmitted for the particular network identifier. This transmitting is such that a second wireless device for which the first wireless device acts as an access point can determine when the next full parent beacon frame is to be transmitted.

Another aspect of the invention is an access point that sends out, for each BSSID, a parent beacon and mini-beacons in between each parent beacon. One embodiment of such an AP has the architecture of FIG. 2. Another embodiment of such an AP has an architecture similar to that shown in FIG. 2, except that the MAC processing for the APs carried out completely in the host processor 221 of the device 203, that is, no streaming of the transmit and receive MAC frames occurs over a fast network.

Yet another aspect of the invention is a wireless station that acts as a client station for an AP that sends out, for each BSSID, a parent beacon and mini-beacons in between each parent beacon. The client is programmed to understand such mini-beacon frames, and is called a mini-beacon aware client herein. One embodiment of such an AP has the architecture similar to that of FIG. 2, except that the MAC processing for the client is carried out completely in the host processor 221 of the device 203. That is, no streaming of the transmit and receive MAC frames occurs over a fast network.

According the IEEE 802.11 standard, full beacon frames are transmitted by an access point according to the beacon period. Furthermore, according the IEEE 802.11 standard, full probe responses are transmitted by an AP after receipt of a probe request.

Figure 4:
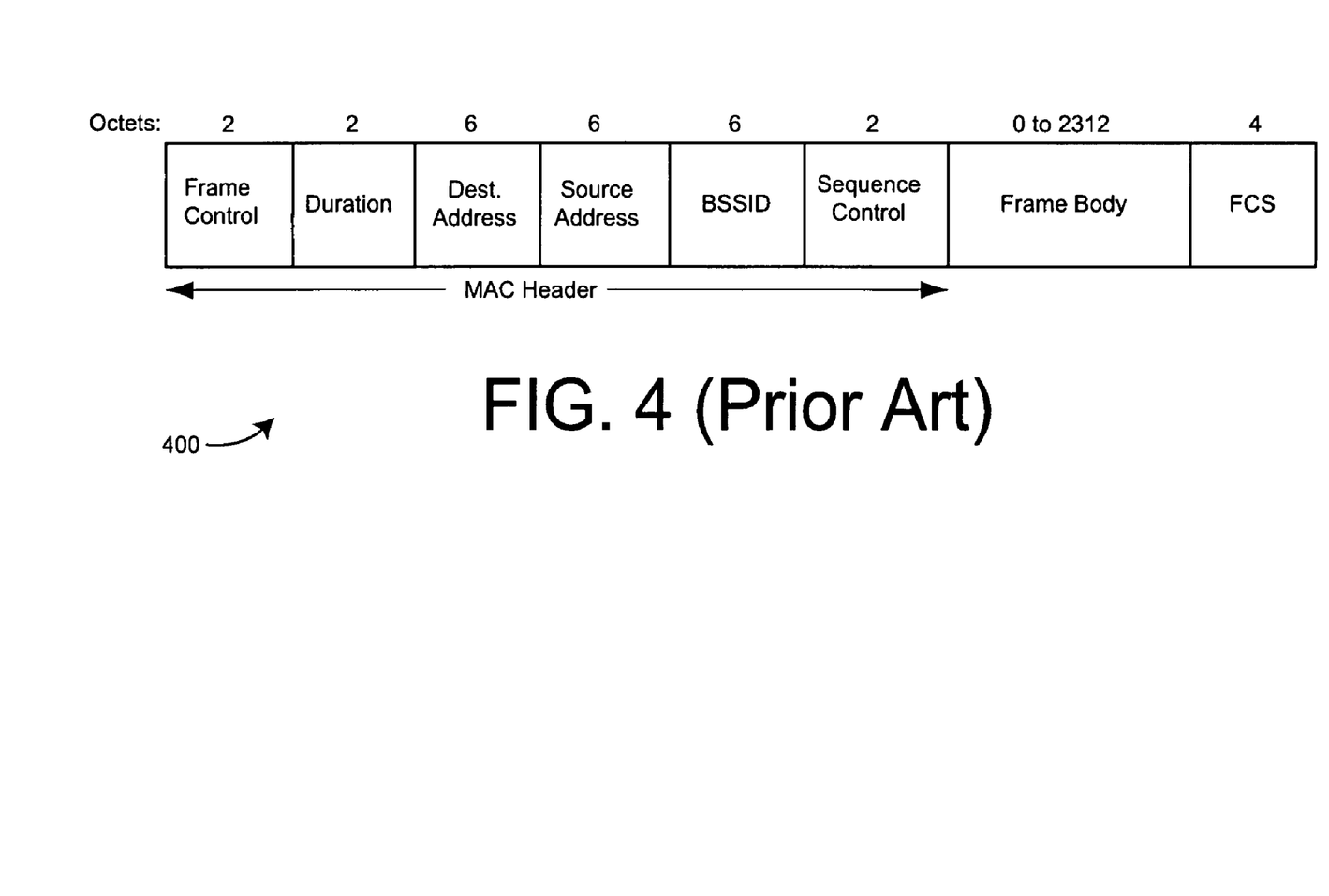
FIG. 4 shows the structure of a MAC frame. Such structure is prior art, but a mini-beacon MAC frame as described herein is not prior art.
Figure 5:
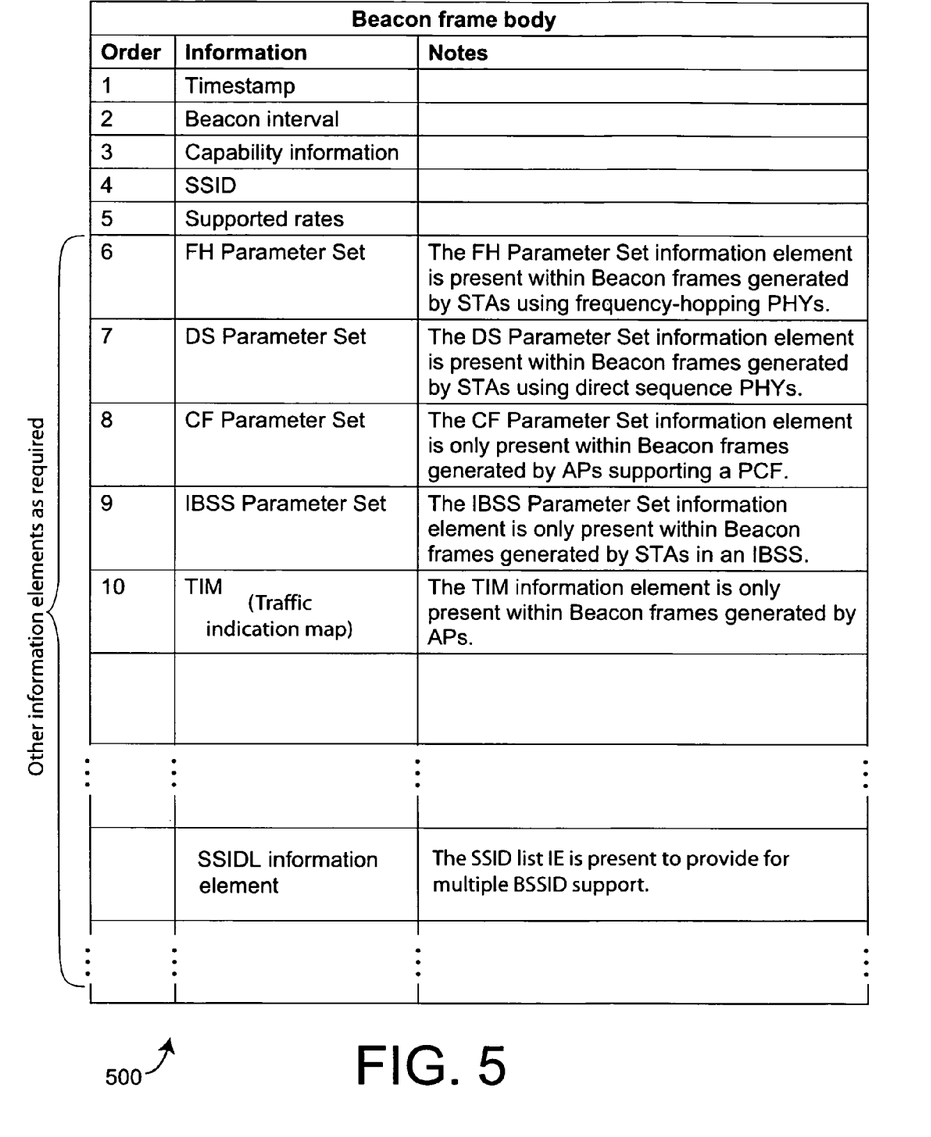
FIG. 5 shows the structure of the frame body of a normal full beacon frame, excluding some information elements that may be included for different variants of the IEEE 802.11 standard, e.g., the IEEE 802.11g standard includes an ERP IE extended rates information element, IEEE 802.11i includes the RSN information element, and so forth.

FIG. 4 shows the structure of a management MAC frame 400 according to the IEEE 802.11 standard. FIG. 5 shows some of the fields, and field order of the frame body part 500 of a beacon frame that has the general structure of the IEEE 802.11 management frame shown in FIG. 4, according to the 2003 version of the standard. Note that as more features, capabilities, and variants are added to the standard, more information units may be included. These are shown as "Other information elements as required" in FIG. 5. Such information elements, for example, are known for different variants of the IEEE 802.11 standard. For example, the IEEE 802.11g standard includes an ERP IE extended rates information element; IEEE 802.11i includes the RSN information element, and so forth. FIG. 5 shows an information element that provides for the transmitting device to act as a "virtual" AP for a plurality of wireless networks, i.e., to support a plurality of BSSIDs. This information element is the SSID list ("SSIDL" (information element. Aspects of the present invention work particularly well with APs that so support multiple SSIDs because full parent beacons transmitted by such an AP can be large, and several need to be transmitted, one per SSID.

Figure 6:
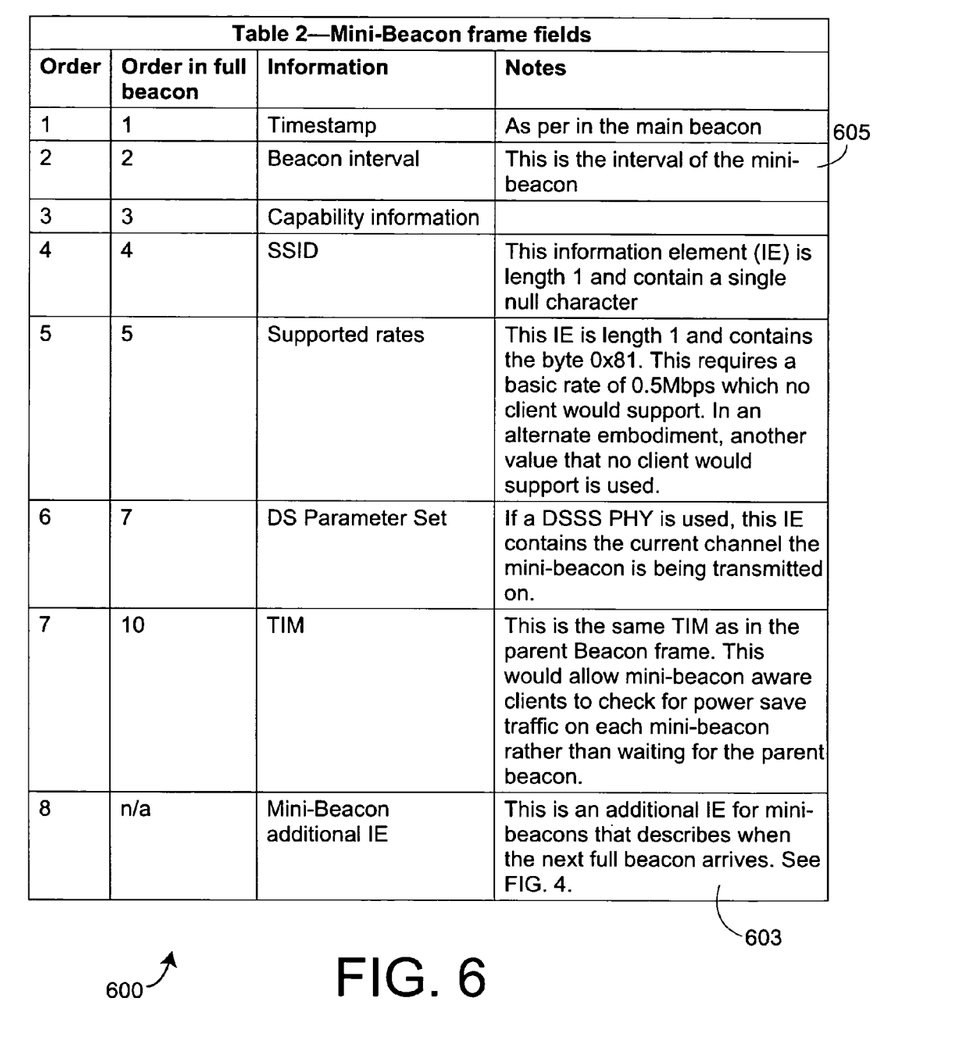
FIG. 6 shows the fields that are contained in one embodiment of the frame body of a mini-beacon frame.

Therefore, an aspect of the invention is to transmit a mini-beacon more often than a full beacon. FIG. 6 shows the fields and field order of the frame body part 600 of one embodiment of a mini-beacon frame. FIG. 6 shows these fields in the field order. As can be seen, the mini-beacon 600 includes a subset of the fields of a full beacon 500, the fields of this subset having the same field definitions as that of a full beacon 500 shown in FIG. 5, e.g., as described in the IEEE 802.11 standard, ISO/IEC 8802-11, first edition, section 7.2.3.1. The mini-beacon embodiment also includes an additional information element (IE) 603, of the type called a "vendor-specific" information element.

One aspect of the invention is that the mini-beacon for a particular BSSID includes the timestamp from the parent beacon frame for the BSSID such that a client receiving a mini-beacon can maintain time synchronization. The AP transmits frames with timestamps at a first frequency higher than the frequency of sending full parent beacon frames.

With this set of fields configured as shown in FIG. 6, it is unlikely any client would attempt to associate to the BSSID represented in the mini-beacon. Reasons for this include an SSID information element having a single null character; a data rate set containing rates not supported under IEEE 802.11b/g/a; and the locally administered bit. Even if the receiving client had sent a probe request to the AP that transmitted the mini-beacon, one embodiment is set up to not respond to that address.

Thus, an aspect of mini-beacons is that the fields of the parent beacon frame that are included in the mini-beacon are selected to discourage a receiving client from attempting to associate with the AP as a result of receiving the mini-beacon.

Furthermore, one embodiment includes the AP that transmitted a mini-beacon, upon receiving a probe request from a client as a result of the client receiving the mini-beacon, does not respond with a probe response to that client.

While embodiments include the above mechanisms for discouraging client associations as a result of receiving mini-beacons, different embodiments include other different mechanisms for discouraging client associations as a result of receiving mini-beacons.

Figure 7:
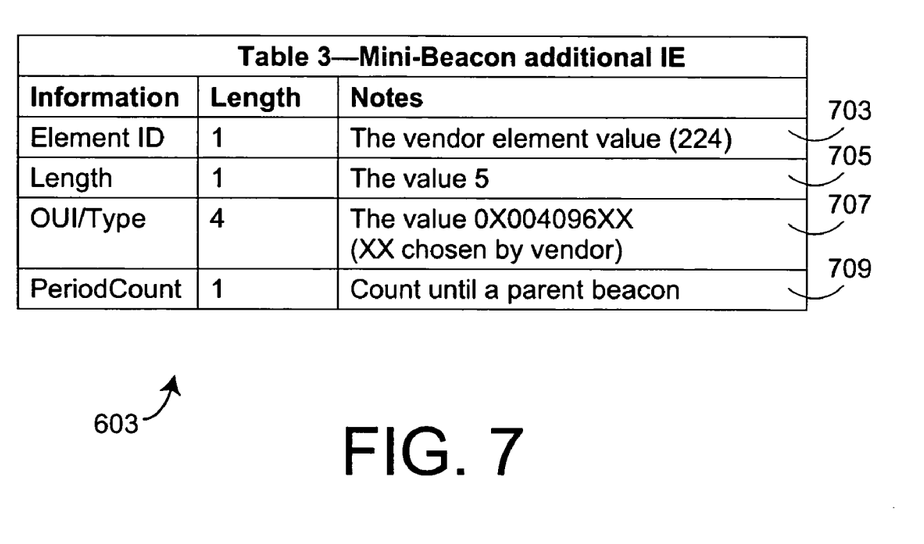
FIG. 7 shows one embodiment of an additional information element contained in the frame body of a mini-beacon frame.

FIG. 7 shows the contents of the additional information element 603 for one embodiment of a mini-beacon 600. The additional IE 603 includes an element ID field 703 that contains, in one version, the value 224, a length counter 705 that contains the length of the data (5), and the MAC organizationally unique identifier (OUI) value and a new type 707 for this IE. Also included in a mini-beacon is an additional counter that operates in a similar manner to the DTIM counter in a regular full beacon (see FIG. 5). The counter 605 of FIG. 6 specifies a mini-beacon period, and a counter field 709 in the additional IE 603 specifies the number of mini-beacon periods until the next full beacon is due. For one BSSID, such a full beacon is called a parent beacon of the mini-beacons of the BSSID herein.

The counter field 709 is called the PeriodCount field, and indicates how many mini-beacon periods before the parent beacon is transmitted. It has a value between 255 and 1. The parent beacon is transmitted after the mini-beacon with a PeriodCount value of 1.

One aspect of the invention is to include client support for an embodiment of the mini-beacon. Aspects of the invention are intended for operation under a set of specifications that specify some extensions to the IEEE 802.11 specifications that deal with the ability of client stations to understand and react appropriately to proprietary extensions of the IEEE 802.11 standard. One such set of extensions is known as the Cisco Compatible Extensions For WLAN Devices ("CCX"), by Cisco Systems, Inc., of San Jose, Calif. For example, under CCX, a client has to be able to transmit with a transmit power accuracy of ±3 dB. One version of the mini-beacon is meant to be included as part of CCX. By a "compliant client" is meant a client that conforms to extensions of the IEEE standard in several ways. According to an aspect of the present invention, a compliant client is also mini-beacon aware, in that the client is able to understand a received mini-beacon and the fields therein, including the additional proprietary information element.

According to one aspect of the invention, a mini-beacon aware (and possible otherwise compliant) client, receiving a mini-beacon frame with fields 600, including the additional IE 603 containing the PeriodCount field 709, would be able to perform off-channel scans for other AP's in the time until the parent beacon is due, or go to sleep until the parent beacon transmission is due.

The embodiment of a mini-beacon frame described herein has a minimum size of only 58 octets (bytes) as follows: 24 octets (bytes) for the header, 12 octets for the fields, 15 octets for the IEs that are also in the parent beacon, and 7 bytes for the additional mini-beacon IE 603.

For power save clients, a TIM information element is included and filled out in a mini-beacon. Using such a mini-beacon, better performance of power-save clients is expected for mini-beacon aware clients in a wireless network.

Furthermore, mini-beacons can also be used to decrease the scan time for mini-beacon aware clients, essentially carrying out the same function as SAPR clients.

Note that in some operating modes, the TIM information element is not filled, such that a mini-beacon is always 58 bytes long rather than varying in size because of the TIM element and power save clients.

Thus, the programming of the AP is such that when the time for transmitting the parent beacon for a BSSID is hit, a full beacon is transmitted containing the real AP capabilities/features for the BSSID, which is then used by listening clients to make a decision on whether to attempt to associate with the given AP. This parent beacon would contain the beacon period of the parent beacon, not the mini-beacon.

In one embodiment, the full parent beacon frame includes an additional information element that specifies that the AP transmitting the full beacon frame is mini-beacon capable, further specifying the mini-beacon period to be used.

In one embodiment, the TIM information element in the mini-beacon is updated to include power save traffic information for clients.

In one embodiment, the TIM information element in the mini-beacon is a fixed field that is not updated to indicate power save traffic information for clients.

In one embodiment, the BSSID used in the mini-beacon is the same as that of the parent BSSID, with the locally administered bit of the address set.

Thus, it is expected that there will be a bandwidth saving using mini-beacons compared to only using full beacon frames. The bandwidth saving increases as the ratio between the parent and mini-beacon periods increases.

For APs that have multiple BSSID's per AP, and for networks with multiple AP's per location, the bandwidth savings could be rather significant.

In one embodiment, the mini-beacon uses the locally administered bit in the mini-beacon frame, which should ensure non-mini-beacon aware clients don't confuse the mini-beacon BSSID with the true BSSID.

Note that using mini-beacon frames still provides backward compatibility with non-compliant clients. Such a non-mini-beacon aware client should not attempt to associate with the BSSID of the mini-beacon.

Furthermore, it is expected that in dense AP situations less time would be spent sending out large beacon frames. One example of a dense AP installation is a wireless Voice-over-IP (VoIP) installation.

Thus has been described a method and a carrier medium, and an apparatus to transmit mini-beacon frames in between full beacon frames for a BSSID supported by the apparatus.

It should be appreciated that although the invention has been described in the context of the IEEE 802.11 standard, the invention is not limited to such contexts and may be utilized in various other applications and systems, including, for example other WLAN standards and other wireless standards. Applications that can be accommodated include IEEE 802.11 wireless LANs and links, wireless Ethernet, HIPER-LAN 2, European Technical Standards Institute (ETSI) broadband radio access network (BRAN), and multimedia mobile access communication (MMAC) systems, wireless local area networks, local multipoint distribution service (LMDS) IF strips, TDMA packet radios, and so forth.

The methodologies described herein are, in one embodiment, performable by a machine, which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, a switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a wireless device that can act as a plurality of "virtual" APs, i.e., a wireless device that can support multiple MAC addresses, e.g., as multiple BSSIDs of infrastructure networks. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, and volatile media, and transmission media. Non-volatile media includes, for example, optical, magnetic disks, and magneto-optical disks. Volatile media includes dynamic memory, such as main memory. For example, the term "carrier medium" shall accordingly be taken to include, but not be limited to, solid-state memories, and optical and magnetic media.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

"Variants of the IEEE 802.11 standard" as used herein means the variants and proposed variants of the IEEE 802.11 standard. Variants are versions defined in clauses of the standard and proposed amendments of the standard.

While one embodiment of a receiver (FIG. 2) operates by splitting MAC tasks between a switch and a wireless device, other embodiments are possible, e.g., in which more of the tasks occur at the wireless device.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
for a particular network identifier of at least one network identifier active in a first wireless device that supports more than one network identifier, the first wireless device including an arrangement for modulating and transmitting, the arrangement including a transmitter and modulator, and medium access control (MAC) hardware coupled to the transmitter and modulator, each network identifier identifying an infrastructure wireless network for which the first wireless device acts as an access point:
transmitting from the first wireless device full parent beacon frames periodically at the beacon frame rate for the particular network identifier and
transmitting from the first wireless device at least one mini-beacon frame in between consecutive full parent beacon frames for the particular network identifier, the transmitting of the at least one mini-beacon frame being in the same channel in which full parent beacon frames are transmitted, each mini beacon frame being shorter than a full parent beacon frame and including a subset of the information in a full parent beacon frame, and further including timing information indicative of when the next full parent beacon frame will be transmitted for the particular network identifier,
wherein transmitting the subset is more frequent than the transmitting of a full beacon frame, and
wherein at least one of:
the information in a mini-beacon is selected such that an unassociated wireless station receiving the mini-beacon is discouraged from attempting to associate with the access point of the particular network identifier, and
the information in a mini-beacon is selected to provide timing information such that a station receiving the mini-beacon frames can maintain synchronization,
such that a second wireless device for which the first wireless device acts as an access point can determine when the next full parent beacon frame is to be transmitted.

2. A method as recited in claim 1, wherein the full parent beacon frame includes an indication that mini-beacons are to be transmitted.

3. A method as recited in claim 2, wherein the full parent beacon frame includes a measure of the period of the mini beacons.

4. A method as recited in claim 1, wherein the mini-beacon for the particular network identifier includes a measure of the period of the mini beacons.

5. A method as recited in claim 1, wherein the mini-beacon for the particular network identifier includes the timestamp from the parent beacon frame such that a client receiving a mini-beacon can maintain time synchronization by the AP transmitting frames with timestamps at a first frequency higher than the frequency of sending parent beacon frames.

6. A method as recited in claim 1, wherein the information in a mini-beacon is selected such that an unassociated wireless station receiving the mini-beacon is discouraged from attempting to associate with the access point of the particular network identifier.

7. A method as recited in claim 1, wherein the access point of the first wireless device substantially conforms to the IEEE 802.11 standard, wherein each of the more than one network identifiers is a BSSID, wherein for the particular BSSID and the first device acting as an AP for the particular BSSID, the full parent beacon frame substantially conforms to an IEEE 802.11 beacon frame, and wherein the infrastructure wireless network for which the first wireless device acts as the access point is a basic service set.

8. A method as recited in claim 7, wherein the mini-beacon includes a BSSID field that contains the BSSID used in the mini-beacon is the same as that of the parent BSSID, with the locally administered bit of the address set.

9. A method as recited in claim 7, wherein the full parent beacon frame includes an indication that mini-beacons are to be transmitted.

10. A method as recited in claim 1, wherein the first wireless device supports a plurality of network identifiers at the same time, such that the first wireless device can act as an access point for more than one wireless network at a time.

11. A method as recited in claim 1, wherein the mini-beacon includes an additional information element that is a vendor-specific information element.

12. A method as recited in claim 11, wherein the additional information element includes a counter field indicative of how many mini-beacon periods before the next parent full beacon frame is to be transmitted.

13. A method as recited in claim 11, wherein the mini-beacon frame has a minimum size of only 58 bytes, including a frame header and the additional mini-beacon information element.

14. An apparatus comprising:
    means for transmitting from a first wireless device, full parent beacon frames periodically at the beacon frame rate for a particular network identifier of at least one network identifier active in the first wireless device, the first network device supporting more than one network identifier active at the same time, the means for transmitting configured such that the transmitting of the at least one mini-beacon is in the same channel in which full parent beacon frames are transmitted, each network identifier identifying an infrastructure wireless network for which the first wireless device acts as an access point; and
    means for transmitting from the first wireless device at least one mini-beacon frame in between consecutive full parent beacon frames for the particular network identifier, each mini beacon frame being shorter than a full parent beacon frame and including a subset of the information in a full parent beacon frame, and further including timing information indicative of when the next full parent beacon frame will be transmitted for the particular network identifier,
wherein the means for transmitting is configured such that the transmitting the subset is more frequent than the transmitting of a full beacon frame, and
wherein at least one of:
the information in a mini-beacon is selected such that an unassociated wireless station receiving the mini-beacon is discouraged from attempting to associate with the access point of the particular network identifier, and
the information in a mini-beacon is selected to provide timing information such that a station receiving the mini-beacon frames can maintain synchronization,
such that a second wireless device for which the first wireless device acts as an access point can determine when the next full parent beacon frame is to be transmitted.

15. An apparatus as recited in claim 14, wherein the full parent beacon frame includes an indication that mini-beacons are to be transmitted.

16. An apparatus as recited in claim 15, wherein the full parent beacon frame includes a measure of the period of the mini beacons.

17. An apparatus as recited in claim 14, wherein the mini-beacon for the particular network identifier includes a measure of the period of the mini beacons.

18. An apparatus as recited in claim 14, wherein the access point of the first wireless device substantially conforms to the IEEE 802.11 standard, wherein each of the at least one network identifiers is a BSSID, wherein for the particular BSSID and the first device acting as an AP for the particular BSSID, the full parent beacon frame substantially conforms to an IEEE 802.11 beacon frame, and wherein the infrastructure wireless network for which the first wireless device acts as the access point is a basic service set.

19. An apparatus as recited in claim 18, wherein the full parent beacon frame includes an indication that mini-beacons are to be transmitted.

20. An apparatus as recited in claim 14, wherein the first wireless device supports a plurality of network identifiers at the same time, such that the first wireless device can act as an access point for more than one wireless network at a time.

21. An apparatus as recited in claim 14, wherein the mini-beacon includes an additional information element that is a vendor-specific information element.

22. An apparatus as recited in claim 21, wherein the additional information element includes a counter field indicative of how many mini-beacon periods before the next parent full beacon frame is to be transmitted.

23. A computer-readable storage medium, on which is encoded at least one computer readable and executable code segment that when executed by one or more processors of a processing system in a first wireless device cause the first wireless device to carry out a method, the method comprising: for a particular network identifier of at least one network identifier active in the first wireless device that supports more than one network identifier active at the same time, the first wireless device including an arrangement for modulating and transmitting, the arrangement including a transmitter and modulator, and medium access control (MAC) hardware coupled to the transmitter and modulator, each network identifier identifying an infrastructure wireless network for which the first wireless device acts as an access point: transmitting from the first wireless device full parent beacon frames periodically at the beacon flame rate for the particular network identifier; and transmitting from the first wireless device at least one mini-beacon flame in between consecutive full parent beacon frames for the particular network identifier, the transmitting of the at least one mini-beacon being in the same channel in which full parent beacon frames are transmitted, each mini beacon frame being shorter than a full parent beacon frame and including a subset of the information in a full parent beacon frame, and further including timing information indicative of when the next full parent beacon frame will be transmitted for the particular network identifier, wherein transmitting the subset is more frequent than the transmitting of a full beacon frame, and wherein at least one of: the information in a mini-beacon is selected such that an unassociated wireless station receiving the mini-beacon is discouraged from attempting to associate with the access point of the particular network identifier, and the information in a mini-beacon is selected to provide timing information such that a station receiving the mini-beacon frames can maintain synchronization, such that a second wireless device for which the first wireless device acts as an access point can determine when the next full parent beacon frame is to be transmitted.

* * * * *

UNITED STATES PATENT AND TRADEMARK OFFICE
CERTIFICATE OF CORRECTION

| | | |
|---|---|---|
| PATENT NO. | : 7,787,401 B2 | Page 1 of 1 |
| APPLICATION NO. | : 11/156054 | |
| DATED | : August 31, 2010 | |
| INVENTOR(S) | : Kinder et al. | |

It is certified that error appears in the above-identified patent and that said Letters Patent is hereby corrected as shown below:

In Column 1, line 17, before "medium" kindly delete the word "MAC".

Signed and Sealed this
Twenty-eighth Day of December, 2010

David J. Kappos
*Director of the United States Patent and Trademark Office*